July 19, 1960 P. VUTZ 2,945,964

PULSED OUTPUT TRANSISTOR FLIP-FLOP

Filed Oct. 31, 1956

INVENTOR.

Peter Vutz,

BY

ATTORNEY.

United States Patent Office 2,945,964
Patented July 19, 1960

2,945,964

PULSED OUTPUT TRANSISTOR FLIP-FLOP

Peter Vutz, Manhattan Beach, Calif., assignor to Hughes Aircraft Company, Culver City, Calif., a corporation of Delaware Filed Oct. 31, 1956, Ser. No. 619,919

1 Claim. (Cl. 307—88.5)

Figure 1:
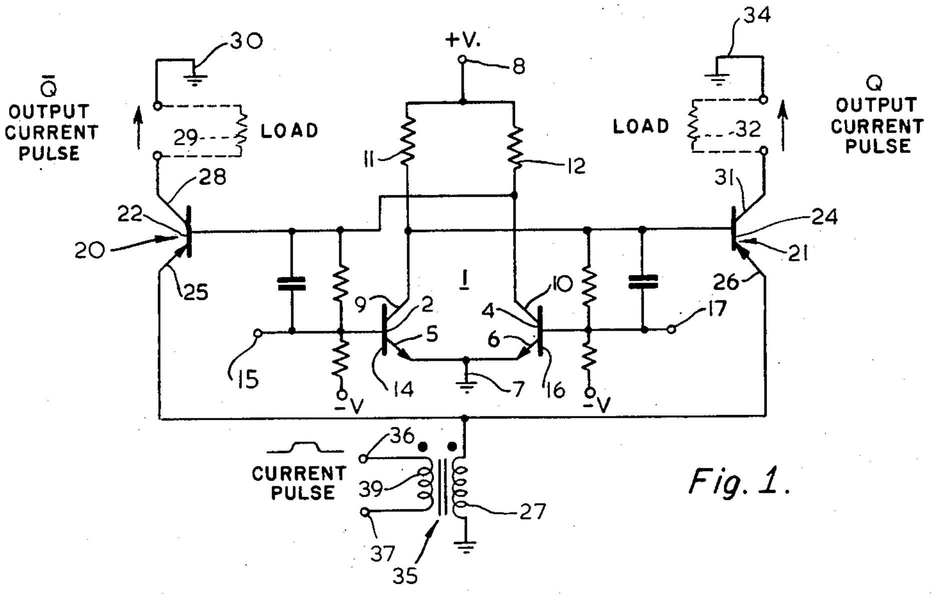

This invention relates to flip-flop circuits, and particularly to a flip-flop arrangement using transistors with magnetic-core, current-state gating.

The improvement lies in an arrangement for directing power from a pulsed source along either of two output channels, with the direction controlled by a conventional bistable circuit.

The invention represents an improvement in the digital computer field, where current-state gating has been developed as a substitute for voltage-state gating in connection with the use of diodes. In voltage-state gating, the voltage in a diode gating network reaches a steady state and is interrogated by a voltage clock pulse to determine its state. In current-state gating, it is the state of currents in control windings of a magnetic core which is interrogated by a current clock pulse.

With such a system, transistor flip-flops have been used to control the current in the cores, although, as an alternative, vacuum tubes or perhaps other cores, could be used.

The advantage of current-state gating has been that it eliminates the relatively large number of gating diodes found in a complex voltage-state system and replaces them with fewer magnetic cores. For example, in a typical serial logical design investigated, the voltage-state system would use 1399 diodes, whereas the current-state system would use 312 cores.

Another feature of such systems using transistors, is that the magnetic core output is sufficiently large to trigger saturated junction transistor flip-flops at clock rates comparable to those used in typical voltage-state systems. By saturating the transistors, their dissipation is minimized and fewer circuit elements are required in the flip-flops.

In magnetic core gating, it is conventional to use an arrangement of windings in which two control windings are disposed on opposite sides of the core, with a clock winding and a trigger winding located quadrally between them. Each core thus has a clock winding, a trigger winding and a number of control windings which may depend upon the logic to be mechanized.

At each clock time, a composite current pulse is applied to the clock winding of each core. The polarity is such that the preparatory pulse applies positive ampere-turns to the core.

With no current present in any of the control windings, the application of a single composite clock pulse will flip the core through the complete hysteresis loop. As the core flips through the loop, voltage will be generated in all windings. The volt-time integral per turn, generated during the preparatory clock pulse, is equal and opposite to that generated during the main clock pulse. This value is equal to twice the saturation flux of the core.

Assume now, a current is present in one of the control windings, so that when the composite clock pulse is applied, the core will traverse the minor hysteresis loop, constituting the saturated portion of the major hysteresis loop. Since the flux in the core remains essentially unchanged, the induced voltage in the windings will be essentially zero. Actually, however, a small voltage, the zero signal, will appear.

If current is present in more than one control winding, the clock is effectively biased, so that the induced voltage due to the clock is still zero. Hence, one or more control currents may inhibit the action of the preparatory clock pulse. As a result, a single core may act as an "and" gate of many terms, limited only by the space available for control windings. If the trigger windings of a number of cores are connected in series, they may be used to act as an "or" combination of "and" gates.

The control currents are supplied by the outputs of transistor flip-flops. Depending on the design of the flip-flop, a number of control windings on different cores can be connected in series across the output of a single flip-flop.

Assume such a conventional flip-flop circuit with the usual outputs to be in the 1 state. An equivalent conventional circuit is shown for vacuum tubes in Figs. 8.2, page 95, of the text "Synthesis of Electronic Computing and Control Circuits," published by the staff of the Computation Laboratory of Harvard University in 1951. The same circuit may be used as well with transistors. In such a circuit using transistors, the bistable Eccles-Jordan circuit would hold the switch constituted by an output transistor connected to one of the circuit outputs open, so that essentially no current flows through the associated control windings. The output transistor connected to the other circuit output and acting as a switch would be closed, allowing a current to flow through the control windings connected to it.

The flip-flop may be triggered by one or more trigger windings connected in series to the flip-flop inputs, conventionally described as J and K or set and reset. When J is 1, a voltage is developed across one or more trigger windings and applied to J. The negative pulse due to the preparatory clock pulse has no effect on the flip-flop, but the positive pulse due to the main clock pulse triggers the flip-flop to the 1 state. A 1 input to K sets the flip-flop to the zero state.

In a circuit typical of the saturated transistor flip-flops known in the art, a pair of transistors with their associated elements and having a common emitter connection would form the conventional Eccles-Jordan circuit. The collectors of these transistors switch the input base currents of the grounded emitter transistor amplifiers, which, in turn, switch the output load currents which we will call Q and $\bar{Q}$. Let us also refer to the flip-flop transistors as TR1 and TR2, and to the output transistors as TR3 and TR4.

When transistor TR2 is in its conducting state, its collector is positive with respect to the emitter of TR3 and, therefore, it holds TR3 in the off state, that is with $Q=1$. Most of the current flowing through the collector resistor of TR1, which is off, flows out of the base of TR4, holding it in saturation. Sufficient current also flows through the cross-coupling resistor to keep TR2 in saturation.

Due to the negative bias voltage on the trigger windings, the flip-flop input diodes used with the conventional circuit arrangement, isolate these windings from the flip-flop between clock pulses and during the preparatory clock pulse. A positive pulse at K, due to the main clock, drives the base of TR2 positive and turns this transistor off. Through a cross-coupling capacitor, a positive pulse is also applied to the base of TR4 which tends to turn it off. The falling collector voltage of TR2 turns on TR1 and TR3. The subsequent rising voltage of TR1 completes the turnoff of TR4.

The trigger windings on the cores can readily supply enough energy to the flip-flop circuit to switch it rapidly even though the transistors are driven into saturation. The output of a trigger winding is a volt-time integral which depends only on the number of turns in the winding and the characteristics of the core, assuming a complete flip. A pulse having a voltage winding sufficient to turn off such a transistor can therefore be obtained by putting enough turns on the trigger winding. A peak trigger current of the order of 200 ma. can be readily applied to the saturated transistor to turn it off quickly.

The diode through which the control current flows, is required to disconnect the flipping control windings from the output transistor during the main clock pulse. Additional clamp diodes may be required to limit the voltages developed during the main clock pulse by the flipping trigger windings and by the flipping control windings.

Flip-flops of these known types have the disadvantage of relatively high total power dissipation, high power dissipation in the transistors during switching, and dependence on the current gain of the output transistors, which decrease at high currents.

The circuitry embodying the present invention overcomes these difficulties and permits the removal of the series diodes from the Q and $\bar{Q}$ out leads of the previously known circuits. It reduces the overall power requirements substantially, requires the dissipation in the transistors during switching of only a relatively small amount of power, and renders the operation of the circuit substantially independent of the current gain of the output transistors.

The objects of the invention thus include substantially reducing the order of magnitude of the power dissipated.

Another object is to make possible high frequency switching without substantial power loss in the transistors.

Yet another object is to render the operation of the circuit substantially independent of the current gain of the output transistors.

Still another object is to permit the removal of the series output diodes in previously known circuit arrangements of this general type.

Figure 2:
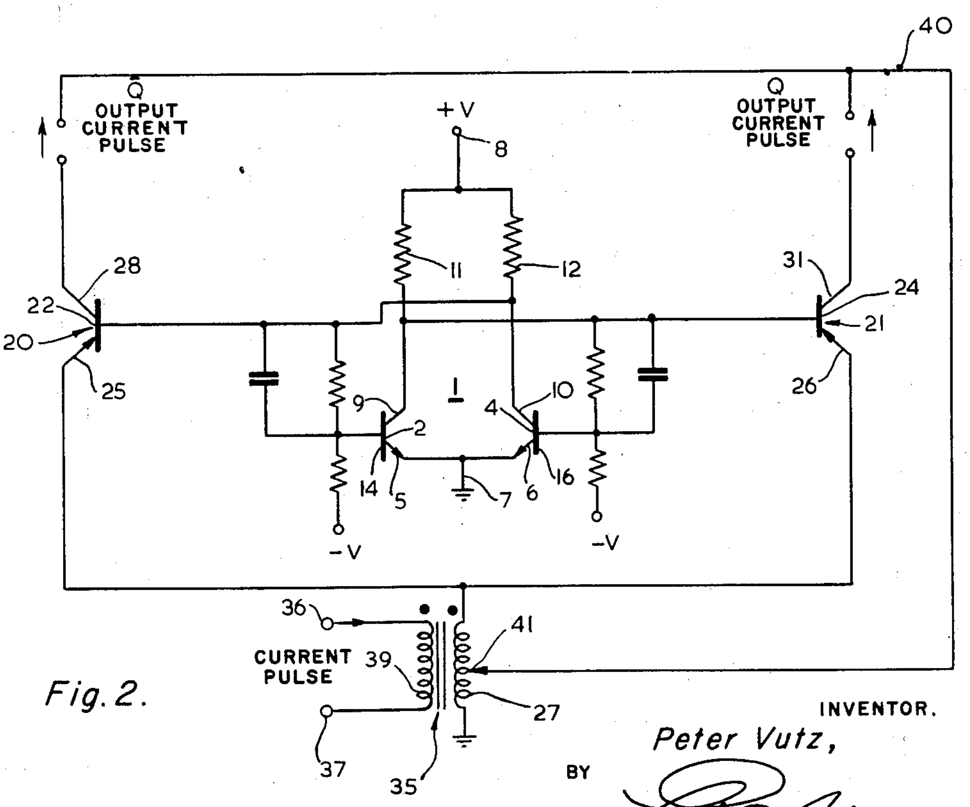

These and other objects may be better understood by reference to the drawings, wherein:

Fig. 1 is a schematic circuit diagram illustrating a preferred embodiment of the present invention; and Fig. 2 is an alternative embodiment of the arrangement shown in Fig. 1.

The advantages of the present invention, which will be described in detail below, are derived from the use of a pulsed source of output power, the pulse being directed along either the Q or the $\bar{Q}$ output, depending upon the condition of the conventional bistable saturating Eccles-Jordan circuit, and incorporating the use of a return lead to the secondary of a pulse input transformer to adjust the bias level of the output transistors. It also permits removing the series output diodes conventionally used between the output transistors and their loads.

Referring now to Fig. 1, in the conventional bistable saturating Eccles-Jordan flip-flop circuit indicated generally as 1, transistors 2 and 4 are connected back-to-back with their respective emitters 5 and 6 grounded at 7.

A positive bias is applied from a conventional voltage source 8 to the respective collectors 9 and 10 through collector resistors 11 and 12. The base 14 of transistor 2 receives an input from a suitable source, not shown, through the J input terminal 15, while the base 16 of transistor 4 receives an input from a suitable source, not shown, through the K input terminal 17.

Two output transistors 20 and 21 are provided, with their bases 22 and 24, respectively, connected to the collector resistor 10 of the flip-flop transistor 4, and to the collector resistor 9 of the transistor 2. The emitters 25 and 26 of output transistors 20 and 21 respectively, are connected together and to a source of pulsed power provided through a transformer secondary 27. The collector 28 of the output transistor 20 is connected to one side of its load, shown schematically at 29, with a return to ground at 30.

The collector 31 of output transistor 21 is connected to its load, shown schematically at 32, with a return to ground at 34.

The current pulse from the pulse transformer secondary 27 is produced by current applied through the pulse input terminals 36 and 37 to the primary 39 of pulse transformer 35. The return circuit to the secondary 27 of the current pulse transformer 35 is completed through the load ground connections 30 and 34.

In the alternative embodiment of Fig. 2, an arrangement is shown suitable for use with low impedance loads. The loads 29 and 32 shown in Fig. 1 have been omitted from Fig. 2 for the sake of clarity. If these loads are of low impedance, the return may conveniently be made through a common lead 40 to a tap 41 on the secondary of the current pulse transformer secondary 27. By properly adjusting the position of the tap 41, the bias level of the potential applied to the output transistors 20 and 21 may be adjusted at will. In this circuit, NPN and PNP transistors may be interchanged if the polarities of the voltages and currents are reversed, as in Fig. 1.

In either embodiment, when an output current is desired, a current pulse is applied to the primary 39 of transformer 35. This causes a current to flow upward in the secondary 27 of the transformer, and the emitters 25 and 26 of the output transistors 20 and 21 become more positive. Since the base 22 of transistor 20 is held at close to ground potential by transistor 4, the output transistor 20 will begin to conduct the current pulse from secondary 27. The base of transistor 21 is held at some positive voltage, since the flip-flop transistor 2 is cut off. The voltage at the base 24 of the output transistor 21 is made more positive than the voltage across the secondary 27 of the input pulse transformer 35. Consequently, transistor 21 does not conduct any of the current pulse. Current to drive a load is thus available at the collector of output transistor 20. By properly pulsing the J input lead 15 or the K input lead 17, the state of the circuit may be reversed. Then an output current will be available at the collector 31 of output transistor 21.

With many transistors the voltage drop from collector to emitter can be made less than the voltage drop from base to emitter. Thus, it may be desirable to return the output currents to some voltage positive with respect to ground particularly in the case of PNP output transistors. This is accomplished in the embodiment illustrated in Fig. 2 by returning the outputs to the tap 41 on the transformer secondary 27.

Thus, this circuit permits the use of a pulsed source of output power in which the pulse is directed along either the Q or the $\bar{Q}$ output, depending on the state of a conventional bistable circuit. The use of a return lead from the output current pulses to an adjustable point along the secondary of the pulse supplying transformer 35 permits the ready adjustment of the bias of the circuit.

This return lead permits raising the collector lead above ground during the pulse, which reduces the power dissipated in the output transformer.

What is claimed is:

In a bistable flip-flop circuit having a first output transistor and a second output transistor connected thereto, means for controlling the base potentials of said transistors, comprising a bistable circuit, and means for introducing pulsed power to said output transistors including a transformer having its secondary connected to the emitters of said output transistors and having a primary connected to the source of pulsed power, and means for returning a portion of the output currents to the secondary of said transformer.

References Cited in the file of this patent

UNITED STATES PATENTS

| | | |
|---|---|---|
| 2,189,317 | Koch | Feb. 6, 1940 |
| 2,428,126 | Nicholson | Sept. 30, 1947 |
| 2,612,621 | Shepherd et al. | Sept. 30, 1952 |
| 2,692,963 | Hathaway | Oct. 26, 1954 |
| 2,774,888 | Trousdale | Dec. 18, 1956 |
| 2,776,420 | Woll | Jan. 1, 1957 |
| 2,831,127 | Braicks | Apr. 15, 1958 |

FOREIGN PATENTS

| | | |
|---|---|---|
| 203,364 | Australia | Sept. 13, 1956 |
| 730,907 | Great Britain | June 1, 1955 |